(12) United States Patent
Faye et al.

(10) Patent No.: US 7,214,438 B2
(45) Date of Patent: May 8, 2007

(54) FUEL CELL APPARATUS WITH PRESSURIZED FUEL TANK AND PRESSURE-REDUCING UNIT FOR SUPPLYING FUEL AT A REDUCED OPERATING PRESSURE

(75) Inventors: Ian Faye, Stuttgart (DE); Thanh-Hung Nguyen-Schaefer, Asperg (DE); Rainer Saliger, Freiberg (DE); Jan-Michael Graehn, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 10/629,260

(22) Filed: Jul. 29, 2003

(65) Prior Publication Data

US 2004/0033402 A1 Feb. 19, 2004

(30) Foreign Application Priority Data

Aug. 14, 2002 (DE) .................. 102 37 164

(51) Int. Cl.
*H01M 8/04* (2006.01)

(52) U.S. Cl. .......................................... 429/17; 429/19

(58) Field of Classification Search .................. 429/26, 429/17, 19
See application file for complete search history.

(56) References Cited

U.S. PATENT DOCUMENTS 4,622,275 A * 11/1986 Noguchi et al. .............. 429/19
5,041,344 A * 8/1991 Kamoshita et al. ........... 429/26

FOREIGN PATENT DOCUMENTS

EP        1 333 518 A1    8/2003
KR        2002-0092292   12/2002

* cited by examiner

*Primary Examiner*—Mark Ruthkosky
(74) *Attorney, Agent, or Firm*—Michael J. Striker

(57) ABSTRACT

The fuel cell apparatus has a fuel cell (1), a pressurized fuel tank (2) for supplying fuel at a supply pressure and a pressure-reducing unit (4) for reducing the supply pressure to an operating pressure of the fuel cell. In order to improve the overall efficiency of the unit in comparison to the art the pressure-reducing unit (4) is constructed as a cooling apparatus for cooling at least one cooling element, preferably a condenser (5).

29 Claims, 2 Drawing Sheets

FUEL CELL APPARATUS WITH PRESSURIZED FUEL TANK AND PRESSURE-REDUCING UNIT FOR SUPPLYING FUEL AT A REDUCED OPERATING PRESSURE

BACKGROUND OF THE INVENTION

1. Field of the Invention

The present invention relates to a fuel cell apparatus comprising a fuel cell, a pressurized fuel tank for supplying fuel under a supply pressure and a pressure-reducing unit for reducing the supply pressure to an operating pressure.

2. Description of the Related Art

Interest in hydrogen as a fuel for the future has increased greatly in recent years. Above all fuel cells operating with hydrogen can produce electrical energy and heat in an environmentally friendly manner. The efficiency of a fuel cell is not limited by the Carnot cycle. Fossil fuel resources can, for example, be conserved with great efficiency because of the use of fuel cells in motor vehicles or in coupled heat-power cogeneration plants.

The fuel cell converts the chemical bond energy of the hydrogen directly to electrical energy, which can be converted into mechanical drive energy e.g. in motor vehicle applications with the help of an electric motor.

Furthermore to an increasing extent modern motor vehicles are equipped with a number of electrical consumers, in order to improve motor control, comfort and/or safety. The resulting higher electrical energy requirements can be met by means of a suitable fuel cell in combination with an internal combustion engine and/or its so-called dynamo or D.C. generator.

So-called PEM fuel cells (polymer electrolyte membrane fuel cells) are used especially for motor vehicle applications. In PEM fuel cells proton-conducting polymer membranes are used. As pure as currently available hydrogen is required as fuel.

Generally hydrogen and/or another fuel, such as natural gas, chemical can react in an internal combustion engine, especially a piston-cylinder motor, to produce mechanical drive energy.

Above all hydrogen and/or hydrogen-containing fuels are stored in a pressurized tank in motor vehicle applications or other insulated systems. Suitable pressurized tanks are currently designed for supply pressures of about 200 to 300 bar. Currently efforts are being made to obtain pressurized tanks designed for supply pressures of up to 700 bar by means of new types of composite materials.

Besides supply of hydrogen in pressurized tanks processes for reforming or the like hydrocarbon fuel, such as gasoline or diesel fuel, are already employed "on board" in motor vehicle applications. Pressurized hydrogen tanks are used especially for improving adjustment-to load change, cold starting processes, for operating difficulties of the reforming process or the like.

For example hydrogen must be available at pressures between 20 and 40 bar during large-scale manufacture of hydrogen from hydrocarbons, e.g. by steam or auto-thermal reforming. Generally the hydrogen is supplied at a supply pressure of about 300 bar by means of a multi-stage compressor. The energy consumption of the compressor amounts to at least about five percent of the supplied energy. Also other processes for pressurizing the supplied fuel are necessary, so that the total efficiency from production to consumption of hydrogen is correspondingly reduced.

SUMMARY OF THE INVENTION

The object of the present invention is a fuel cell apparatus of the above-described kind, with which the total efficiency of the apparatus is increased in comparison to the current apparatus used in the art.

This object and others, which will be made more apparent hereinafter, are attained in a fuel cell apparatus comprising a fuel cell, a pressurized fuel tank for supplying fuel at a supply pressure and a pressure-reducing unit for reducing the supply pressure to an operating pressure that is lower than the supply pressure.

According to the invention the pressure-reducing unit comprises a cooling apparatus for cooling at least one cooling element.

Various preferred embodiments of the fuel cell apparatus according to the invention are described in the following description and claims.

Different consumers and/or components of the fuel cell apparatus, other apparatuses and/or spaces can be cooled with the help of a suitably constructed cooling apparatus in an advantageous manner with the comparatively lower temperature levels produced in the pressure-reducing unit and/or with the expansion cooling. In an advantageous manner the system and total efficiency of the apparatus is increased by the reduction in the parasitic power (e.g. cooling blowers). This produces an especially efficient use of the total energy available in the fuel.

As much as possible the cooling element is in direct thermal contact with the pressure-reducing unit. Advantageously the cooling element is formed as a heat exchanger. For example, the cooling of the cooling apparatus produced by expansion is transferred by means of a cooling fluid of the cooling element, e.g. a cooling liquid or a cooling gas, such as cooling air. This permits especially simple and/or advantageous cooling of suitable consumers and/or cool components, especially of the fuel cell apparatus.

Preferably the cooling apparatus includes at least two heat exchangers. Advantageous cooling of a cooling fluid of the cooling apparatus is performed in a first heat exchanger. Cooling of a consumer and/or cool component and heating of the cooling fluid advantageously takes place in a second heat exchanger of a consumer and/or a cool component, among others, of the fuel cell apparatus.

In an especially preferred embodiment of the invention the cooling element is a condenser for condensation of an operating substance, primarily from the fuel cell. For example, water vapor, which arises on the cathode side of the fuel cell, is condensed by the condenser or separator, so that liquid water, for example, is recycled for use in moisturizing the fuel cell or product flow from the fuel cell. Generally neutral water content of the fuel cell apparatus is thereby obtained in an advantageous manner, i.e. water does not need to be stored as an operating medium for normal operation. Accordingly the expense of operating of the fuel cell apparatus is reduced.

Alternatively or in combination with the foregoing the cooling element can be an air conditioning apparatus for air conditioning of a space. For example the space can be a passenger compartment of a motor vehicle or at least one interior room of a building. The passenger compartment or the room can then be cooled in an advantageous manner. As much as possible then separate air conditioning units for the room are eliminated or reduced in size, so that the construction and operating expenses are considerably reduced.

Basically the cooling apparatus according to the invention can be a special and/or separate cooling circulation, above all, with the above-mentioned consumers and/or components. In an advantageous embodiment of the invention a cooling unit and/or the cooling circulation includes at least one cooling element. Generally currently used fuel cells are cooled by means of the cooling element or unit of the fuel cell apparatus or a suitable cooling circulation. Frequently about 50% of the enthalpy of the material flow through the current fuel cells transported or dissipated away by means of a suitable main cooling circulation. Since the operating temperature of few types of fuel cells is between about 60° C. and 90° C., which is comparatively close to ambient temperature, i.e. there is only a small temperature difference with the surroundings, accordingly cooling devices used up to now have had comparatively large dimensions. According to the invention in contrast a comparatively low temperature level and/or a relatively large temperature difference can be produced using the cooling device, which cools the fuel cell in an advantageous manner.

Preferably at least one and/or a separate heat exchanger is arranged on and/or in the fuel cell, which is preferably in a close thermal contact with it. This feature permits an especially simple cooling of the fuel cell by means of the cooling apparatus. For example, the heat exchanger is integrated in the primary cooling circulation of the fuel cell apparatus, so that the cooling work for the fuel cell is correspondingly reduced. Generally the heat exchanger of the fuel cell is usually arranged downstream of the air conditioner and/or the heat exchanger and/or condenser for condensation of the operating substance, so that the temperature of the condenser and/or the air conditioner has the lowest temperature of the fuel cell apparatus.

Preferably the pressure-reducing unit is a valve, especially a throttle valve. This embodiment of the invention is especially simple.

A suitable throttle valve permits an especially exactly and comparatively simple control and/or reduction of the supply pressure to the operating pressure. The safety of the fuel cell apparatus is advantageously increased by the comparatively reliable reduction of the supply pressure to the operating pressure.

Preferably the pressure-reducing unit is constructed as a machine for converting a fluid flow into mechanical energy. Conversion of the compression energy into mechanical energy is accomplished in an advantageous manner with this feature besides the production of cold by expansion. If necessary the mechanical energy can be used for fulfilling the most different functions of the fuel cell apparatus or the like of a motor vehicle, a home energy supply system or the like. As much as possible an electric generator is used for making electrical energy. The electrical energy produced thereby can be used for the most different purposes. For example electrical consumers of a motor vehicle can be at least partially operated.

Preferably the pressure-reducing unit has a compressor for compression of the operating medium from the fuel cell and/or the air conditioner. In this variant of the invention the compression energy of the fuel for another operating medium of the fuel cell apparatus and/or the air conditioner can be evaluated or analyzed.

Generally the pressure-reducing unit, especially one or more throttle valves and/or machines for converting fluid flow to mechanical energy, can be a commercially available component. In the case of these embodiments the fuel cell apparatus has an especially economical form.

Basically the pressure-reducing unit can be embodied as a single stage unit, i.e. the supply pressure is only reduced in a single process step to the operating pressure. However alternatively a multi-stage reduction of the supply pressure to the operating pressure can be performed in special application situations. In these latter embodiments of the invention several successively connected expansion stages can be provided in an advantageous manner.

Basically the throttle valve and/or the machine for converting fluid flow to mechanical energy and the heat exchanges can be embodied as separate, side-by-side components or integrated into a single integrated unit. An especially good energy integration is obtained in the latter variant of the invention.

In an especially advantageous embodiment of the invention at least one preferably separate heat exchanger for heating the fuel is provided. For example, a comparatively great cooling of the fuel during the expansion can thus be avoided in an effective manner and/or the fuel is heated to about the operating temperature of the fuel cell. As much as possible the separate heat exchanger is constructed so that it uses the dissipated heat of the fuel cell, an internal combustion engine and/or other components producing heat for heating the fuel to the operating temperature of the fuel cell. As much as possible a separate heating unit, which for example burns fuel of the apparatus, can be used.

Advantageously the apparatus includes at least one internal combustion engine. With this feature the fuel cell apparatus can be constructed as a so-called "APU", i.e. auxiliary power unit. In an advantageous manner the internal combustion engine can be used as heat source and/or as cold sink according to the invention.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
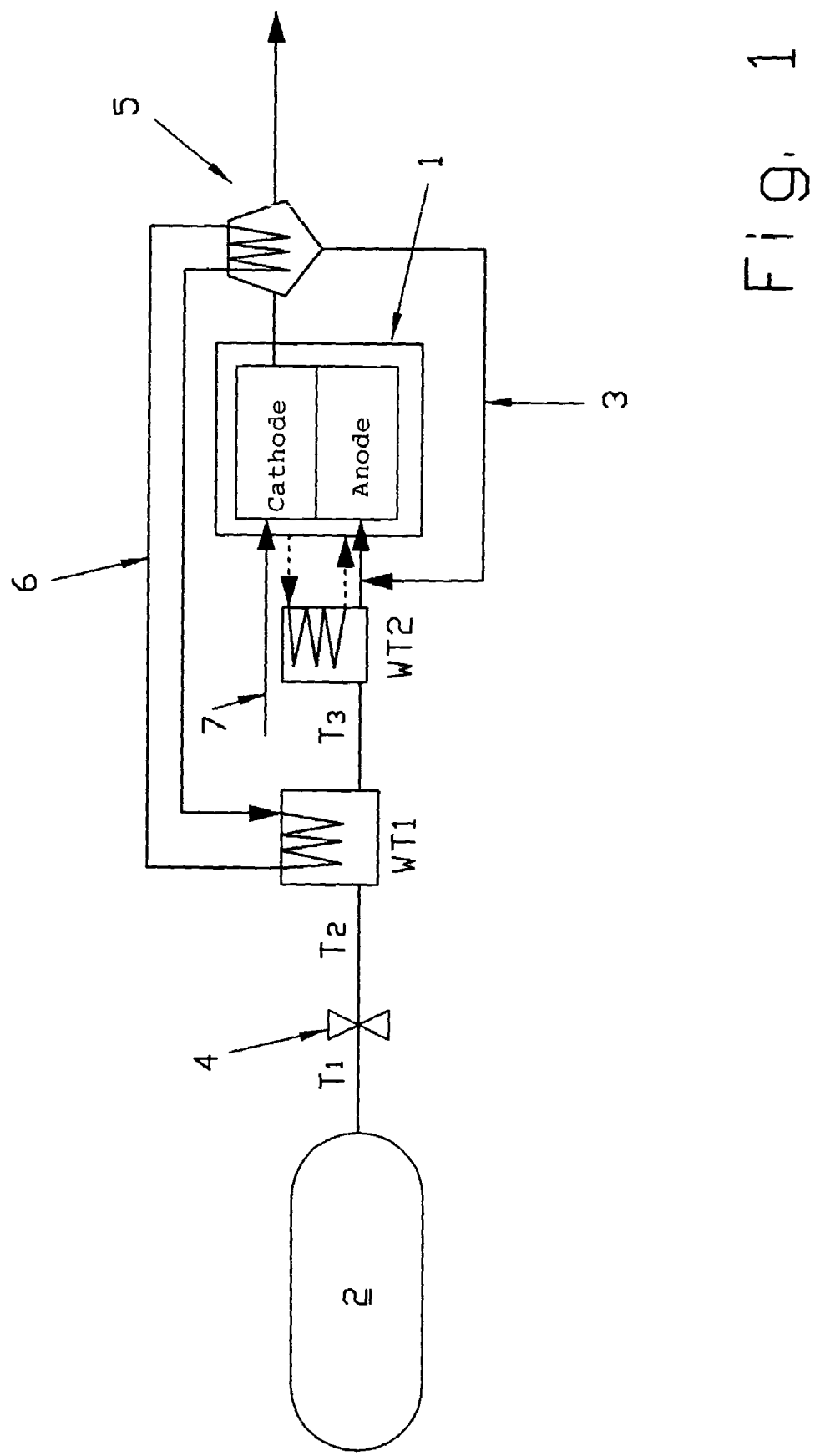
FIG. 1 is a schematic block diagram of one embodiment of a fuel cell apparatus according to the invention.

A fuel cell apparatus is shown in FIG. 1 with a fuel cell 1 and/or a fuel cell stack 1 and a pressurized tank 2 for storing hydrogen under pressure. For example, the fuel cell 1 is a PEM fuel cell 1, which is supplied on the anode side (labeled "anode") with hydrogen from the pressurized tank 2. The fuel cell 1 is also supplied on the cathode side (labeled "Cathode") with air 7 acting as a fuel.

A water-enriched airflow results from the electrochemical reaction of hydrogen and oxygen. For neutral water balance, i.e. water 3 need not be stored like a fuel, the water 3 flowing out can be condensed again by means of a condenser 5 and is available for moistening the membrane.

According to the invention the cold produced by the expansion is used for condensation of the water 3. This occurs by means of a heat exchanger WT1 and the condenser 5.

As illustrated in FIG. 1 the supply pressure of the pressurized tank 2 is reduced by means of a throttle valve 4 and/or a turbine or the like to the operating pressure of the fuel cell 1. Thus an expansion of the fuel through the throttle valve 4 occurs. The fuel can thus be cooled from ambient temperature T1 to a very low temperature T2, e.g. to −100° C.

The expansion cold can preferably be supplied directly to the water condenser 5 or the like by means of a suitable cooling agent and/or heat exchanger WT1 and/or thermal contact.

For example the throttle valve 4 can be arranged beside the heat exchanger WT1. According to FIG. 2 in an alternative embodiment the throttle valve 4 and the heat exchanger WT1 can be embodied in a special largely closed unit 10, in which for example a cooling medium flows through the throttle valve 4.

As much as possible the temperature T3 downstream from the heat exchanger WT1 in the flow direction is under the operating temperature of the fuel cell 1, so that an optionally provided separate heat exchanger for heating the fuel of the fuel cell 1 can be used. This heat exchanger WT2 is in thermal contact with the fuel cell 1, whereby its dissipated heat can be used in an advantageous manner. The total efficiency of the apparatus increases because of the reduction of the heat transferred by the main cooling circulation.

A main cooling circulation 8 (see FIG. 2) of the fuel cell 1 not shown in detail in FIG. 1 can be dimensioned somewhat smaller according to the invention, which reduces the total construction expense.

The cooling medium of the cooling circulation loop 6 according to FIG. 1 has, for example, a temperature between 60° C. and 90° C. The temperature in the condenser is about 40° C. to 60° C. The operating temperature of the fuel cell 1 can be in a range between 70° C. and 80° C.

The cooling circulation loop 6 essentially comprises the heat exchanger WT1 and condenser 5.

Figure 2:
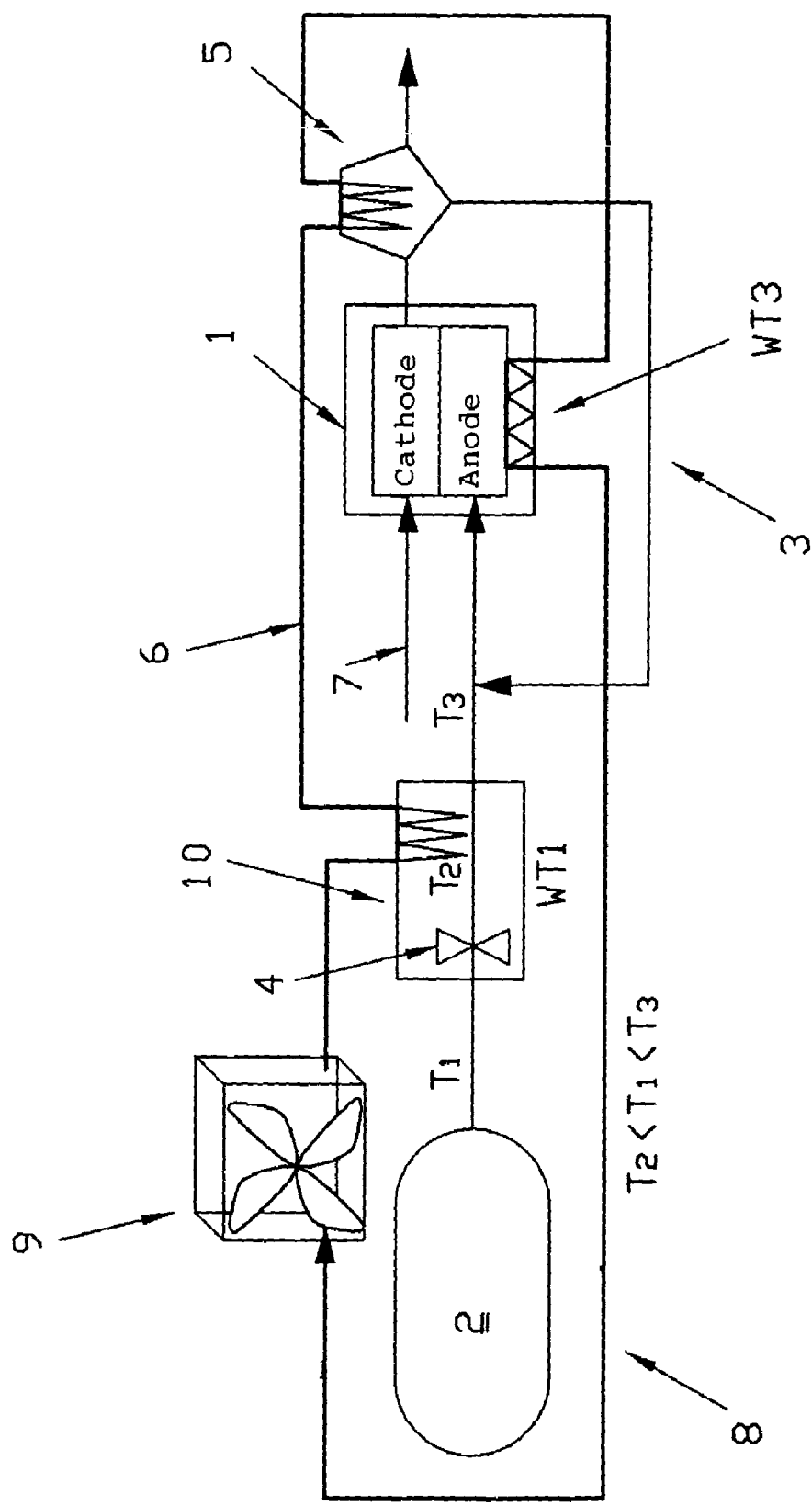
FIG. 2 is a schematic block diagram of another embodiment of a fuel cell apparatus according to the invention.

In FIG. 2 comparable components are shown with the same reference numbers as in FIG. 1. In FIG. 2 however the main cooling circulation 8 is shown in contrast to FIG. 1. This main cooling circulation 8 comprises a cooling device 9, including a cooling blower, as well as the heat exchanger WT1, the condenser 5 and a separate heat exchanger WT3. The optionally provided heat exchanger WT2 is omitted from the embodiment shown in FIG. 2.

Without more detailed illustration the main cooling circulation 8 can be used for the apparatus according to FIG. 1 including a suitable unshown heat exchanger WT3 for cooling the fuel cell 1.

The cooling temperature of about 60° C. obtained by the if necessary conventional cooling device 9 is further lowered by the heat exchanger WT1 according to FIG. 2. The cooling medium, which has been cooled as much as possible, serves, above all, first for cooling the water condenser 5, in which the cooling medium has a temperature of about 50° C. The condenser 5 generally has the lowest temperature in the system.

The cooling medium acts to cool the fuel cell 1 by means of the heat exchanger WT3 in the flow direction downstream of the condenser 5. The operating temperature of the fuel cell is at about 70° C. to 80° C. The temperature level of the cooling medium is somewhat higher than in the condenser 5. The heat transported away is however clearly greater than in the condenser 5. Subsequently the cooling medium of the main cooling circulation 8 is conducted further from the cooling device 9.

According to the illustrated embodiment a neutral water balance of the fuel cell apparatus is simpler to maintain than in the state of the art. Moreover the dimensions or size of the main cooling circulation 8 can be reduced. Thus the structural size and the parasitic power arising in connection with the cooling of the system, e.g. of the cooling blower, of the cooling pump, and so forth, can be reduced.

In an unshown manner electrical energy for example produced for an electric motor of the vehicle is produced by the fuel cell 1. Alternatively a fuel cell apparatus according to the invention can be used also with stationary systems, e.g. coupled heat-power cogeneration plants.

Similarly in an unshown manner alternatively or in combination with the condenser 5 the expansion cold obtain by means of the condenser WT1 can be used for assisting or producing a controlled air conditioning of a passenger compartment or building. Again an air conditioning compressor can reduce parasitic loads.

Alternatively a multi-stage turbine or the like can be provided, which has as many stage as possible, for pressure reduction as an alternative to the throttle valve 4. The turbine converts a part of the compression energy into mechanical energy. The cooling of the expanding fuel and/or gas and the cold that is available are correspondingly reduced.

Generally other gaseous fuel, such as natural gas or the like, can be used besides hydrogen-containing fuel.

Furthermore the pressure-reducing unit can be constructed as a cooling device for cooling at least one cooling element for an internal combustion engine, which is equipped with a pressurized fuel tank for supplying a fuel under a supply pressure and a pressure-reducing unit for reducing the supply pressure to an operating pressure that is lower than the supply pressure.

The disclosure in German Patent Application 102 37 164.4 of Aug. 14, 2002 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fuel cell apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A fuel cell apparatus comprising a fuel cell (1), a pressurized fuel tank (2) for supplying fuel at a supply pressure and a pressure-reducing unit for reducing said supply pressure to an operating pressure of the fuel cell, wherein said pressure-reducing unit comprises a cooling apparatus for cooling at least one cooling element.

2. The fuel cell apparatus as defined in claim 1, wherein said at least one cooling element comprises a heat exchanger.

3. The fuel cell apparatus as defined in claim 1, wherein said cooling apparatus comprises at least two heat exchangers.

4. The fuel cell apparatus as defined in claim 1, wherein said at least one cooling element comprises a condenser (5) for condensation of an operating medium.

5. The fuel cell apparatus as defined in claim 1, wherein said at least one cooling element (5) comprises an air conditioning apparatus for air conditioning a space.

6. The fuel cell apparatus as defined in claim 1, further comprising cooling means (8) for cooling and wherein said cooling means (8) at least comprises said cooling apparatus.

7. The fuel cell apparatus as defined in claim 1, wherein at least one heat exchanger is arranged on said fuel cell (1).

8. The fuel cell apparatus as defined in claim 1, wherein said pressure-reducing unit comprises a throttle valve (4).

9. The fuel cell apparatus as defined in claim 1, wherein said pressure-reducing unit comprises a machine for producing mechanical energy from a fluid flow.

10. The fuel cell apparatus as defined in claim 3, further comprising a separate heat exchanger for heating said fuel for the fuel cell (1).

11. The fuel cell apparatus as defined in claim 10, wherein said separate heat exchanger comprises means for using dissipated heat from said fuel cell (1).

12. The fuel cell apparatus as defined in claim 1, further comprising at least one internal combustion engine.

13. An energy generating apparatus for generating electrical and/or heat energy, said energy generating apparatus comprising a fuel cell (1), a pressurized fuel tank (2) for supplying fuel at a supply pressure and a pressure-reducing unit for reducing said supply pressure to an operating pressure, wherein said pressure-reducing unit comprises a cooling apparatus for cooling at least one cooling element.

14. The energy generating apparatus as defined in claim 13, wherein said at least one cooling element comprises a heat exchanger.

15. The energy generating apparatus as defined in claim 13, wherein said cooling apparatus comprises at least two heat exchangers.

16. The energy generating apparatus as defined in claim 13, wherein said at least one cooling element comprises a condenser (5) for condensation of an operating medium.

17. The energy generating apparatus as defined in claim 13, wherein said at least one cooling element (5) comprises an air conditioning apparatus for air conditioning a space.

18. The energy generating apparatus as defined in claim 13, further comprising cooling means (8) for cooling and wherein said cooling means (8) at least comprises said cooling apparatus.

19. The energy generating apparatus as defined in claim 13, wherein at least one heat exchanger is arranged on said fuel cell (1).

20. The energy generating apparatus as defined in claim 13, wherein said pressure-reducing unit comprises a throttle valve (4).

21. A motor vehicle comprising a fuel cell apparatus, said fuel cell apparatus comprising a fuel cell (1), a pressurized fuel tank (2) for supplying fuel at a supply pressure and a pressure-reducing unit for reducing said supply pressure to an operating pressure, wherein said pressure-reducing unit comprises a cooling apparatus for cooling at least one cooling element.

22. The motor vehicle as defined in claim 21, further comprising an internal combustion engine.

23. The motor vehicle as defined in claim 21, wherein said at least one cooling element comprises a heat exchanger.

24. The motor vehicle as defined in claim 21, wherein said cooling apparatus comprises at least two heat exchangers.

25. The motor vehicle as defined in claim 24, wherein said at least one cooling element comprises a condenser (5) for condensation of an operating medium.

26. The motor vehicle as defined in claim 24, wherein said at least one cooling element (5) comprises an air conditioning apparatus for air conditioning a space.

27. The motor vehicle as defined in claim 24, further comprising cooling means (8) for cooling and wherein said cooling means (8) at least comprises said cooling apparatus.

28. The motor vehicle as defined in claim 24, wherein at least one heat exchanger is arranged on said fuel cell (1).

29. The motor vehicle as defined in claim 24, wherein said pressure-reducing unit comprises a throttle valve (4).

* * * * *